(12) United States Patent
Gallagher et al.

(10) Patent No.: US 11,073,157 B2
(45) Date of Patent: *Jul. 27, 2021

(54) EFFICIENT, LOW PRESSURE RATIO PROPULSOR FOR GAS TURBINE ENGINES

(71) Applicant: RAYTHEON TECHNOLOGIES CORPORATION, Farmington, CT (US)

(72) Inventors: Edward J. Gallagher, West Hartford, CT (US); Byron R. Monzon, Cromwell, CT (US); Shari L. Bugaj, Haddam, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 4 days.

This patent is subject to a terminal disclaimer.

(21) Appl. No.: 16/515,506

(22) Filed: Jul. 18, 2019

(65) Prior Publication Data
US 2019/0368501 A1    Dec. 5, 2019

Related U.S. Application Data

(63) Continuation of application No. 15/709,567, filed on Sep. 20, 2017, now abandoned, which is a
(Continued)

(51) Int. Cl.
*F02C 7/36* (2006.01)
*F04D 29/02* (2006.01)
(Continued)

(52) U.S. Cl.
CPC ........... *F04D 29/023* (2013.01); *F01D 5/147* (2013.01); *F01D 5/282* (2013.01); *F01D 15/12* (2013.01);
(Continued)

(58) Field of Classification Search
CPC . F02K 3/06; F01D 5/282; F01D 5/141; F01D 5/147; F02C 7/36
See application file for complete search history.

(56) References Cited

U.S. PATENT DOCUMENTS

| 2,258,792 | A | 4/1941 | New |
| 2,936,655 | A | 5/1960 | Peterson et al. |

(Continued)

FOREIGN PATENT DOCUMENTS

| EP | 0791383 | 8/1997 |
| EP | 1142850 | 10/2001 |

(Continued)

OTHER PUBLICATIONS

Third Party Observations submitted by Rolls-Royce Plc for European Patent Application No. 12174431.2 (EP2543867) mailed Feb. 29, 2020.

(Continued)

*Primary Examiner* — Justin D Seabe
(74) *Attorney, Agent, or Firm* — Carlson, Gaskey & Olds, P.C.

(57) ABSTRACT

A gas turbine engine includes a gear assembly, a bypass flow passage, a fan located upstream of the bypass flow passage, a first shaft and a second shaft, a first turbine coupled through the gear assembly to the fan, a first compressor coupled with the first shaft, and a second turbine coupled with the second shaft. The fan includes a hub and a row of fan blades that extend from the hub. The row includes a number (N) of the fan blades that is from 16 to 20, a solidity value (R) at tips of the fan blades, and a ratio of N/R that is from 12.3 to 20.

20 Claims, 3 Drawing Sheets

Related U.S. Application Data continuation of application No. 14/695,373, filed on Apr. 24, 2015, now Pat. No. 9,909,505, which is a continuation-in-part of application No. 13/484,858, filed on May 31, 2012, now Pat. No. 9,121,368, which is a continuation of application No. 13/176,365, filed on Jul. 5, 2011, now Pat. No. 9,506,422.

(51) Int. Cl.

| | | |
|---|---|---|
| *F02K 3/06* | (2006.01) | |
| *F01D 5/28* | (2006.01) | |
| *F01D 5/14* | (2006.01) | |
| *F02K 1/06* | (2006.01) | |
| *F01D 15/12* | (2006.01) | |
| *F04D 29/053* | (2006.01) | |
| *F04D 29/32* | (2006.01) | |
| *F04D 29/38* | (2006.01) | |
| *F04D 29/52* | (2006.01) | |
| *F04D 29/56* | (2006.01) | |
| *F02C 3/06* | (2006.01) | |

(52) U.S. Cl.
CPC .................. *F02C 3/06* (2013.01); *F02C 7/36* (2013.01); *F02K 1/06* (2013.01); *F02K 3/06* (2013.01); *F04D 29/053* (2013.01); *F04D 29/325* (2013.01); *F04D 29/388* (2013.01); *F04D 29/526* (2013.01); *F04D 29/563* (2013.01); *F05D 2220/32* (2013.01); *F05D 2220/323* (2013.01); *F05D 2220/327* (2013.01); *F05D 2220/36* (2013.01); *F05D 2260/4031* (2013.01); *F05D 2300/603* (2013.01); *Y02T 50/60* (2013.01)

(56) References Cited

U.S. PATENT DOCUMENTS

| | | |
|---|---|---|
| 3,021,731 A | 2/1962 | Stoeckicht |
| 3,194,487 A | 7/1965 | Tyler et al. |
| 3,287,906 A | 11/1966 | McCormick |
| 3,352,178 A | 11/1967 | Lindgren et al. |
| 3,412,560 A | 11/1968 | Gaubatz |
| 3,468,473 A | 9/1969 | Davies et al. |
| 3,664,612 A | 5/1972 | Skidmore et al. |
| 3,747,343 A | 7/1973 | Rosen |
| 3,754,484 A | 8/1973 | Roberts |
| 3,820,719 A | 6/1974 | Clark |
| 3,892,358 A | 7/1975 | Gisslen |
| 3,932,058 A | 1/1976 | Harner et al. |
| 3,935,558 A | 1/1976 | Miller et al. |
| 3,988,889 A | 11/1976 | Chamay et al. |
| 4,130,872 A | 12/1978 | Harloff |
| 4,284,174 A | 8/1981 | Salvana et al. |
| 4,289,360 A | 9/1981 | Zirin |
| 4,478,551 A | 10/1984 | Honeycutt, Jr. et al. |
| 4,486,146 A | 12/1984 | Campion |
| 4,649,114 A | 3/1987 | Miltenburger et al. |
| 4,696,156 A | 9/1987 | Burr et al. |
| 4,885,912 A | 12/1989 | Nakhamkin |
| 4,979,362 A | 12/1990 | Vershure, Jr. |
| 5,102,379 A | 4/1992 | Pagluica et al. |
| 5,141,400 A | 8/1992 | Murphy et al. |
| 5,169,288 A | 12/1992 | Gliebe et al. |
| 5,317,877 A | 6/1994 | Stuart |
| 5,361,580 A | 11/1994 | Ciokajlo et al. |
| 5,433,674 A | 7/1995 | Sheridan et al. |
| 5,447,411 A | 9/1995 | Curley et al. |
| 5,466,198 A | 11/1995 | McKibbin et al. |
| 5,524,847 A | 6/1996 | Brodell et al. |
| 5,634,767 A | 6/1997 | Dawson |
| 5,677,060 A | 10/1997 | Terentieva et al. |
| 5,769,607 A | 6/1998 | Neely et al. |
| 5,778,659 A | 7/1998 | Duesler et al. |
| 5,857,836 A | 1/1999 | Stickler et al. |
| 5,915,917 A | 6/1999 | Eveker et al. |
| 5,975,841 A | 11/1999 | Lindemuth et al. |
| 5,985,470 A | 11/1999 | Spitsberg et al. |
| 6,004,095 A | 12/1999 | Waitz et al. |
| 6,158,210 A * | 12/2000 | Orlando .................. F02C 3/067 29/889.2 |
| 6,195,983 B1 | 3/2001 | Wadia et al. |
| 6,223,616 B1 | 5/2001 | Sheridan |
| 6,315,815 B1 | 11/2001 | Spadaccini et al. |
| 6,318,070 B1 | 11/2001 | Rey et al. |
| 6,382,905 B1 | 5/2002 | Czachor et al. |
| 6,387,456 B1 | 5/2002 | Eaton, Jr. et al. |
| 6,517,341 B1 | 2/2003 | Brun et al. |
| 6,607,165 B1 | 8/2003 | Manteiga et al. |
| 6,709,239 B2 | 3/2004 | Chandraker |
| 6,709,492 B1 | 3/2004 | Spadaccini et al. |
| 6,814,541 B2 | 11/2004 | Evans et al. |
| 6,883,303 B1 | 4/2005 | Seda |
| 7,021,042 B2 | 4/2006 | Law |
| 7,107,756 B2 | 9/2006 | Rolt |
| 7,219,490 B2 | 1/2007 | Dev |
| 7,241,112 B2 | 7/2007 | Dambrine |
| 7,328,580 B2 | 2/2008 | Lee et al. |
| 7,374,403 B2 | 5/2008 | Decker et al. |
| 7,591,754 B2 | 9/2009 | Duong et al. |
| 7,594,388 B2 | 9/2009 | Cherry |
| 7,632,064 B2 | 12/2009 | Somanath |
| 7,662,059 B2 | 2/2010 | McCune |
| 7,758,306 B2 | 7/2010 | Burton et al. |
| 7,770,377 B2 | 8/2010 | Rolt |
| 7,806,651 B2 | 10/2010 | Kennepohl et al. |
| 7,824,305 B2 | 11/2010 | Duong et al. |
| 7,828,682 B2 | 11/2010 | Smook |
| 7,882,691 B2 | 2/2011 | Lemmers, Jr. et al. |
| 7,926,260 B2 | 4/2011 | Sheridan et al. |
| 7,950,237 B2 * | 5/2011 | Grabowski .............. F02K 1/70 60/771 |
| 7,997,868 B1 | 8/2011 | Liang et al. |
| 8,205,432 B2 | 6/2012 | Sheridan |
| 8,667,775 B1 | 3/2014 | Kisska et al. |
| 8,951,632 B2 | 2/2015 | Shah et al. |
| 9,121,412 B2 | 9/2015 | Gallagher et al. |
| 2006/0228206 A1 * | 10/2006 | Decker .................. F01D 5/141 415/1 |
| 2008/0003096 A1 | 1/2008 | Kohli et al. |
| 2008/0095633 A1 | 4/2008 | Wilson |
| 2008/0116009 A1 | 5/2008 | Sheridan et al. |
| 2008/0155961 A1 | 7/2008 | Johnson |
| 2008/0206048 A1 | 8/2008 | Coupe |
| 2008/0219849 A1 | 9/2008 | Decker et al. |
| 2008/0226454 A1 | 9/2008 | Decker et al. |
| 2008/0317588 A1 | 12/2008 | Grabowski et al. |
| 2009/0056343 A1 | 3/2009 | Suciu et al. |
| 2009/0074565 A1 | 3/2009 | Suciu et al. |
| 2009/0245997 A1 | 10/2009 | Hurwitz et al. |
| 2009/0314881 A1 | 12/2009 | Suciu et al. |
| 2010/0089019 A1 | 4/2010 | Knight et al. |
| 2010/0105516 A1 | 4/2010 | Sheridan et al. |
| 2010/0148396 A1 | 6/2010 | Xie et al. |
| 2010/0150696 A1 | 6/2010 | Lenk |
| 2010/0162683 A1 | 7/2010 | Grabowski et al. |
| 2010/0212281 A1 | 8/2010 | Sheridan |
| 2010/0218483 A1 | 9/2010 | Smith |
| 2010/0260609 A1 | 10/2010 | Wood et al. |
| 2010/0331139 A1 | 12/2010 | McCune |
| 2011/0020130 A1 | 1/2011 | Murakami |
| 2011/0142670 A1 * | 6/2011 | Pilpel .................. F01D 5/282 416/230 |
| 2011/0159797 A1 | 6/2011 | Beltman et al. |
| 2011/0293423 A1 | 12/2011 | Bunker et al. |
| 2012/0124964 A1 | 5/2012 | Hasel et al. |
| 2013/0008146 A1 | 1/2013 | Gallagher et al. |
| 2013/0008170 A1 | 1/2013 | Gallagher et al. |
| 2014/0363276 A1 | 12/2014 | Vetters |

(56) References Cited

U.S. PATENT DOCUMENTS

2015/0233250 A1 8/2015 Gallagher et al.
2016/0069275 A1 3/2016 Lecordix et al.

FOREIGN PATENT DOCUMENTS

| EP | 1712738 | 10/2006 |
|---|---|---|
| EP | 2543867 | 1/2013 |
| GB | 1516041 | 6/1978 |
| GB | 2041090 | 9/1980 |
| GB | 2426792 | 12/2006 |
| WO | 2007038674 | 4/2007 |
| WO | 2015034630 | 3/2015 |
| WO | 2015047511 | 4/2015 |

OTHER PUBLICATIONS

Metzger, F.B., Hanson, D.B., Menthe, R.W., and Towle, G.B. (1973). Analytical parametric investigation of low pressure ration fan noise. NASA-CR-2188. Mar. 1973. pp. 1-119.
Balle, J.K.O. (2016). General Electric F101-GE-102. Retrieved from: http://www.fi-powerweb.com/Engine/General-Electric-F101.html.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Middleton, P. (1971). 614: VFW's jet feederliner. Flight International, Nov. 4, 1971. p. 725, 729-732.
Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-31.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Baker, R.W. (2000). Membrane technology and applications. New York, NY: McGraw-Hill. pp. 87-151.
Cheryan, M. (1998). Ultrafiltration and microfiltration handbook. Lancaster, PA: Tecnomic Publishing Company, Inc. pp. 171-236.
Seader, J.D. and Henley, E.J. (1998). Separation process principles. New York, NY: John Wiley & Sons, Inc. pp. 722-726 and 764-771.
Spadaccini, L.J., and Huang, H. (2002). On-line fuel deoxygenation for coke suppression. ASME, Jun. 2002. pp. 1-7.
Darrah, S. (1987). Jet fuel deoxygenation. Interim Report for Period Mar. 1987-Jul. 1988. pp. 1-22.
Bucknell, R.L. (1973). Influence of fuels and lubricants on turbine engine design and performance, fuel and lubricant analyses. Final Technical Report, Mar. 1971-Mar. 1973. pp. 1-252.
Hazlett, R.N. (1991). Thermal oxidation stability of aviation turbine fuels. Philadelphia, PA: ASTM. pp. 1-163.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Hemighaus, G., Boval, T., Bacha, J., Barnes, F., Franklin, M., Gibbs, L., . . . Morris, J. (2007). Aviation fuels: Technical review. Chevron Products Company. pp. 1-94. Retrieved from: https://www.cgabusinessdesk.com/document/aviation_tech_review.pdf.
Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.
Edwards, T. and Zabarnick, S. (1993). Supercritical fuel deposition mechanisms. Ind. Eng. Chem. Res. vol. 32. 1993. pp. 3117-3122.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Technical Data. Teflon. WS Hampshire Inc. Retrieved from: http://catalog.wshampshire.com/Asset/psg_teflon_ptfe.pdf.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Edkins, D.P., Hirschkron, R., and Lee, R. (1972). TF34 turbofan quiet engine study. Final Report prepared for NASA. NASA-CR-120914. Jan. 1, 1972. pp. 1-99.
Waters, M.H. and Schairer, E.T. (1977). Analysis of turbofan propulsion system weight and dimensions. NASA Technical Memorandum. Jan. 1977. pp. 1-65.
Meyer, A.G. (1988). Transmission development of TEXTRON Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Gates, D. Bombardier flies at higher market. Seattle Times. Jul. 13, 2008. pp. C6.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Trembley, JR., H.F. (1977). Determination of effects of ambient conditions on aircraft engine emissions. ALF 502 combustor rig testing and engine verification test. Prepared for Environmental Protection Agency. Sep. 1977. pp. 1-256.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Drago, R.J. (1974). Heavy-lift helicopter brings up drive ideas. Power Transmission Design. Mar. 1987. pp. 1-15.
Krantz, T.L. (1990). Experimental and analytical evaluation of efficiency of helicopter planetary stage. NASA Technical Paper. Nov. 1990. pp. 1-19.

(56) References Cited

OTHER PUBLICATIONS

Heingartner, P., MBA, D., Brown, D. (2003). Determining power losses in the helical gear mesh; Case Study. ASME 2003 Design Engineering Technical Conferences. Chicago, IL. Sep. 2-6, 2003. pp. 1-7.

Thulin, R.D., Howe, D.C., and Singer, I.D. (1982). Energy efficient engine: High pressure turbine detailed design report. Prepared for NASA. NASA CR-165608. Received Aug. 9, 1984. pp. 1-178.

Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.

Gray, D.E. (1978). Energy efficient engine preliminary design and integration studies. Prepared for NASA. NASA CR-135396. Nov. 1978. pp. 1-366.

Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.

McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.

Mattingly, J.D. (1996). Elements of gas turbine propulsion. New York, New York: McGraw-Hill, Inc. pp. 1-18, 50-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.

Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.

Datasheet. CF6-80C2 high-bypass turbofan engines. Retreived from https://geaviation.com/sites/default/files/datasheet-CF6-80C2.pdf.

Salemme, C.T. and Murphy, G.C. (1979). Metal sparlsuperhybrid shell composite fan blades. Prepared for NASA. NASA-CR-159594. Aug. 1979. pp. 1-127.

"Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old".

Datasheet. Genx™ high bypass turbofan engines. Retreived from: https://www.geaviation.com/sites/default/files/datasheet-genx.pdf.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers, 108(8), 65-67.

Faghri, A. (1995). Heat pipe and science technology. Washington, D.C: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.G., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau, K, Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Nendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

(56) References Cited

OTHER PUBLICATIONS

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines-Turbofan. Feb. 8, 2012.
Ivchenko-Progress AI-727M. Jane's Aero-engines, Aero-engines-Turbofan. Nov. 27, 2011.
Ivchenko-Progress D-727. Jane's Aero-engines, Aero-engines-Turbofan. Feb. 7, 2007.
Turbomeca Aubisque. Jane's Aero-engines, Aero-engines-Turbofan. Nov. 2, 2009.
Aviadvigatel D-110. Jane's Aero-engines, Aero-engines-Turbofan. Jun. 1, 2010.
Rolls-Royce M45H. Jane's Aero-engines, Aero-engines-Turbofan. Feb. 24, 2010.
Honeywell LF502. Jane's Aero-engines, Aero-engines-Turbofan. Feb. 9, 2012.
Winn, A. (Ed). (1990). Wide Chord Fan Club. Flight International, 4217(137). May 23-29, 1990. pp. 34-38.
Parker, R.G. and Lin, J. (2001). Modeling, modal properties, and mesh stiffness variation instabilities of planetary gears. Prepared for NASA. NASA/CR-2001-210939. May 2001. pp. 1-111.
Mancuso, J.R. and Corcoran, J.P. (2003). What are the differences in high performance flexible couplings for turbomachinery? Proceedings of the Thirty-Second Turbomachinery Symposium. 2003. pp. 189-207.
Dudley, D.W., Ed. (1954). Handbook of practical gear design. Lancaster, PA: Technomic Publishing Company, Inc. pp. 3.96-102 and 8.12-18.
Dudley, D.W., Ed. (1962). Gear handbook. New York, NY: McGraw-Hill. pp. 3.14-18 and 12.7-12.21.
Dudley, D.W., Ed. (1994). Practical gear design. New York, NY: McGraw-Hill. pp. 119-124.
Product Brochure. Garrett TFE731. Allied Signal. Copyright 1987. pp. 1-24.
Honeywell Learjet 31 and 35136 TFE731-2 to 2C Engine Upgrade Program. Sep. 2005. pp. 1-4.
Honeywell Sabreliner 65 TFE731-3 to -3D Engine Upgrade Program. Oct. 2005. pp. 1-4.
U.S. Department of Transportation: Federal Aviation Administration Type Certificate Data Sheet No. E6WE. Dated: May 9, 2000. p. 1-.
Kurzke, J. (2012). GasTurb 12: Design and off-design performance of gas turbines. Retrieved from: https://www.scribd.com/document/153900429/GasTurb-12.
Ahmad, F. and Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.
Riegler, C., and Bichlmaier, C. (2007). The geared turbofan technology- Opportunities, challenges and readiness status. Porceedings CEAS. Sep. 10-13 2007. Berlin, Germany. pp. 1-12.
About GasTurb. Retrieved Jun. 26, 2018 from: http://gasturb.de/about-gasturb.html.

Kurzke, J. (2001). GasTurb 9: A program to calculate design and off-design performance of gas turbines. Retrieved from: https://www.scribd.com/document/92384867/GasTurb9Manual.
Tummers, B. (2006). DataThief III. Retreived from: https://datathief.org/DatathiefManual.pdf pp. 1-52.
Manual. Student's Guide to Learning SolidWorks Software. Dassault Systemes-SolidWorks Corporation. pp. 1-156.
Macisaac, B. and Langston, R. (2011). Gas turbine propulsion systems. Chichester, West Sussex: John Wiley & Sons, Ltd. pp. 260-265.
Datasheet. CFM56-5B For the Airbus A320ceo family and CFM56-7B for the Boeing 737 family. https://www.cfmaeroengines.com/.
Turner, M. G., Norris, A., and Veres, J.P. (2004). High-fidelity three-dimensional simulation of the GE90. NASA/TM-2004-212981. pp. 1-18.
Defeo, A. and Kulina, M. (1977). Quiet clean short-haul experimental engine (QCSEE) main reduction gears detailed design final report. Prepared for NASA. NASA-CR-134872. Jul. 1977. pp. 1-221.
Amezketa, M., Iriarte, X., Ros, J., and Pintor, J. (2009). Dynamic model of a helical gear pair with backlash and angle0varying mesh stiffness. Multibody Dynamics 2009, ECCOMAS Thematic Conference. 2009. pp. 1-36.
Singh, A. (2005). Application of a system level model to study the planetary load sharing behavior. Jounal of Mechanical Design. vol. 127. May 2005. pp. 469-476.
Smith-Boyd, L. and Pike, J. (1986). Expansion of epicyclic gear dynamic analysis program. Prepared for NASA. NASA CR-179563. Aug. 1986. pp. 1-98.
Wikipedia. Torsion spring. Retreived Jun. 29, 2018 from: https://en.wikipedia.org/wiki/Torsion_spring.
AGMA Standard (2006). Design manual for enclosed epicyclic gear drives. Alexandria, VA: American Gear Manufacturers Association. pp. 1-104.
AGMA Standard (1997). Design and selection of components for enclosed gear drives. lexandria, VA: American Gear Manufacturers Association. pp. 1-48.
Daly, M. Ed. (2007). Jane's Aero-Engine. Issue Twenty-three. Mar. 2008. p. 707-712.
AGMA Standard (1999). Flexible couplings-Mass elastic properties and other characteristics. Alexandria, VA: American Gear Manufacturers Association. pp. 1-46.
Wikipedia. Stiffness. Retreived Jun. 28, 2018 from: https://en.wikipedia.org/wiki/Stiffness.
Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears.
Hill, P.G., Peterson, C.R. (1965). Mechanics and thermodynamics of propulsion. Addison-Wesley Publishing Company, Inc. pp. 307-308.
Hill, P.G., Peterson, C.R. (1992). Mechanics and thermodynamics of propulsion, 2nd Edition. Addison-Wesley Publishing Company, Inc. pp. 400-406.
Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.
Gray, D.E. and Gardner, W.B. (1983). Energy efficient engine program technology benefit/cost study—vol. 2. NASA CR-174766. Oct. 1983. pp. 1-118.
Munt, R. (1981). Aircraft technology assessment: Progress in low emissions engine. Technical Report. May 1981. pp. 1-171.
Waters, M.N. and Schairer, E.T. (1977). Analysis of turbofan propulsion system weight and dimensions. NASA Technical Memorandum. Jan. 1977. pp. 1-65.
Avco Lycoming Divison. ALF 502L Maintenance Manual. Apr. 1981. pp. 1-118.

(56) References Cited

OTHER PUBLICATIONS

Type Certificate Data Sheet No. E6NE. Department of Transportation Federal Aviation Administration. Jun. 7, 2002. pp. 1-10.

Trembley, Jr., H.F. (1977). Determination of effects of ambient conditions on aircraft engine emissions. Prepared for Environmental Protection Agency. Ann Arbor, Michigan. Sep. 1977 pp. 1-256.

Honeywell LF502. Jane's Aero-engines, Aero-engines-Turbofan. Aug. 17, 2016.

Rauch, D. (1972). Design study of an air pump and integral lift engine ALF-504 using the Lycoming 502 core. Prepare for NASA. Jul. 1972. pp. 1-182.

Dassault Falcon 900EX Easy Systems Summary. Retrieved from: http://www.smartcockpit.com/docs/F900EX-Engines.pdf pp. 1-31.

Honeywell TFE731 Pilot Tips. pp. 1-143.

Honeywell TFE731-5AR to -5BR Engine Conversion Program. Sep. 2005. pp. 1-4.

Garret TFE731 Turbofan Engine (CAT C). Chapter 79: Lubrciation System. TTFE731 Issue 2. 2010. pp. 1-24.

McArdle, J.G. (1979). Static test-stand performance of the YF-102 turbofan engine with several exhaust configurations for the quiet short-haul research aircraft (QSRA). Nasa Technical Paper. Nov. 1979. pp. 1-68.

Petition for Inter Partes Review of U.S. Pat. No. 9,121,412. *General Electric Company*, Petitioner, v. *United Technologies Corporation*, Patent Owner. Filed Apr. 25, 2016.

Declaration of Reza Abhari, Ph.D. in re U.S. Pat. No. 9,121,412. Executed Apr. 23, 2016. pp. 1-71.

Meier, N. (2005). Civil Turbojet/Turbofan Specifications. Retrieved from http://www.jet-engine.net/civffspec.html.

Decision for Inter Partes Review of U.S. Pat. No. 9,121,412. Claims 1, 2, 4, 5, 7, 8, and 11. *General Electric Company*, Petitioner v. *United Technologies Corporation*, Patent Owner. Entered date of Oct. 27, 2016.

Marsh, G. (2012). Aero engines lose weight thanks to composites. Reinforced Plastics. 56(6). Nov. 1, 2012. pp. 32-35.

European Search Report for European Patent Application No. 16166928 completed Sep. 7, 2016.

European Search Report for European Patent Application No. 12174431 completed Sep. 8, 2016.

Thompson, L. (2016). Gamechanger: How Pratt & Whitney transformed itself to lead a revolution in jet propulsion. Forbes. Retrieved Apr. 28, 2016 from: http://www.forbes.com/sites/lorenthompson/2016/01/21/gamechanger-how-pratt-whitney-transformed-itself-to-lead-a-revolu ion-in-jet-propulsion/print/.

Grose, T.K. (2013). Reshaping flight for fuel efficiency: Five technologies on the runway. National Geographic. Retrieved Mar. 16, 2016 from: http://news.nationalgeographic.com/news/energy/2013/04/130423-reshaping-flight-for-fuel-efficiency.html.

Krauskopf, L. & Shumaker, L. (2014). GE exec says avoided geared design in jet engine battle with Pratt. Reuters. Sep. 15, 2014. http://www.reuters.com/article/us-general-electric-united-tech-engine-idUSKBN0HA2H620140915.

Tsang, D. (2011). Special report: The engine battle heats up (Update 1). Aspire Aviation. Retrieved Apr. 3, 2016 from: http://www.aspireaviation.com/2011/05/10/pw-purepower-engine-vs-cfm-leap-x/.

Dixon, S.L. (1998). Fluid mechanics, thermodynamics of turbomachinery. Oxford: Elsevier Butterworth-Heinemann. pp. 94-144.

Epstein, A.H. (2014). Aeropropulsion for commercial aviation in the twenty-first century and research directions needed. AiAA Journal 52(5). May 2014. pp. 901-911.

Mattingly, J.D. (1996). Elements of gas turbine propulsion. New York, New York: McGraw-Hill, Inc. pp. 299-305.

Deposition Transcript of Reza Abhari, Ph.D. *General Electric Company*, Petitions vs. *United Technologies Corporation*, Patent Owner. IPR2016-00952. pp. 1-224.

Pratt & Whitney (2014). Evaluation of ARA catalytic hydrothermolysis (CH) fuel: Continuous lower energy, emissions and noise (CLEEN) program. FR-27652-2 Rev. 1. Apr. 30, 2014. pp. 1-17.

Declaration of Dr. K. Mathioudakis. In re U.S. Pat. No. 9,121,412. Executed Jan. 27, 2017. pp. 1-65.

Benzakein, M.J. (2001). Propulsion strategy for the 21st century—A vision into the future. pp. 1-9.

Mattingly, J.D. (2006). Elements of propulsion gas turbines and rockets. . New York, New York: AAIA Education Series. p. 419.

Horlock, J.H. (1958). Axial flow compressors: Fluid mechanics and thermodynamics. London: Butterworths Scientific Publications. pp. 29, 70.

Bullock, R.O. and Johnsen, I.A. (Eds.) (1965). Aerodynamic design of axial-flow compressors. NASA-SP-36. Jan. 1, 1965. pp. 1-505.

Flack, R. (2005). Fundamentals of jet propulsion with applications. New York: Cambridge University Press. p. 281.

Xu, L. & Gronstedt, T. (2010). Design analysis of an intercooled turbofan engine. Journal of Engineering for Gas Turbine Engines and Power vol. 132. Nov. 2010. pp. 114503-1-114503-4.

Hill, P.G. & Peterson, C.R. (2010). Mechanics and thermodynamics of propulsion, 2nd Edition. New Delhi, India: Dorling Kindersley. p. 225-226.

Guynn, M.D., Berton, J.J. & Haller, W.J. (2013). Advanced single-aisle transport propulsion design options revisited. AIAA 2013-4330. Aug. 12-14, 2013. p. 1-17.

Patent Owner's Response. *General Electric Company*, Petition, V. *United Technologies Corporation*, Patent Owner. U.S. Pat. No. 9,121,412. IPR2016-00952. Filed Jan. 27, 2017. p. 1-75.

Coy, Peter. The little gear that could reshape the jet engine: A simple idea's almost 30-year, $10 billion journey oto the aircraft mainstream. Bloomberg Business. Oct. 15, 2015. p. 1-4.

Read, B. (2014). Powerplant revolution. AeroSpace. May 2014. pp. 28-31.

Warwick, G. (2007). Civil engines: Pratt & Whitney gears up for the future with GTF. Flight International, Nov. 2007. Retrieved Jun. 14, 2016 from: https://www.flightglobal.com/news/articles/civil-engines-pratt-amp-whitney-gears-up-for-the-future-with-219989/.

Petition for Inter Partes Review of U.S. Pat. No. 9,121,368. *General Electric Company*, Petitioner, v. *United Technologies Corporation*, Patent Owner. IPR2018-01123. Filed May 18, 2018.

Declaration of Magdy Attia. In re U.S. Pat. No. 9,121,368. IPR2018-01123. Executed May 17, 2018. pp. 1-89.

Decision Denying Institution of Inter Partes Review. *General Electric Company*, Petittioner, v. *United Techologies Corporation*, Patent Owner. IPR2018-01123. U.S. Pat. No. 9,121,368. Entered Nov. 29, 2018. pp. 1-25.

Guynn, M.D., Berton, J.J., Fisher, K, Haller, W.J., Tong, M.T. & Thurman, D.R. (2009). Analysis of turbofan design options for an advanced sing-aisle transport aircraft. AAIA 2009-6942. Sep. 21-23, 2009. p. 1-13.

Wikipedia (2010). Rolls-Royce Pegasus. Retrieved Apr. 26, 2010 from: http://web.archive.org/web/20/20100426043206/https://en.wikipedia.org/wiki/Rolls-Royce_Pegasus.

Holcombe, V. (2013). Aero-Propulsion Technology (APT): Task V-Low noise ADP engine definition study. NASA/CR-2003-212521. Technical Report prepared for NASA. Oct. 2003.

Honeywell LF507. Jane's Aero-engines, Aero-engines-Turbofan. Feb. 9, 2012.

Honeywell TFE731. Jane's Aero-engines, Aero-engines-Turbofan. Jul. 18, 2012.

NASA Conference Publication. Quiet, powered-lift propulsion. Cleveland, Ohio. Nov. 14-15, 1978. pp. 1-420.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8). Start p. 32.

Hendricks, E.S. and Tong, M.T. (2012). Performance and weight estimates for an advanced open rotor engine. NASA/TM-2012-217710. pp. 1-13.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.

Zalud, T. (1998). Gears put a new spin on turbofan performance. Machine Design, 70(20), p. 104.

(56) References Cited

OTHER PUBLICATIONS

Kurzke, J. (2008). Preliminary Design, Aero-engine design: From state of the art turbofans towards innovative architectures. pp. 1-72.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 3-12, 2009, Orlando, Florida, USA. pp. 1-12.
Han, J., Dutta, S., and Ekkad, S.V. (2000). Gas turbine heat transfer and cooling technology. New York, NY: Taylor & Francis. pp. 1-25, 129-157, and 160-249.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.
Declaration of Reza Abhari, Ph.D. In re U.S. Pat. No. 8,844,265. Executed Jun. 28, 2016. pp. 1-91.
Declaration of John Eaton, Ph.D. In re U.S. Pat. No. 8,869,568. Executed Mar. 28, 2016. pp. 1-87.
Declaration of Reza Abhari. In re U.S. Pat. No. 8,695,920. Executed Nov. 30. pp. 1-67.
Declaration of Reza Abhari. In re U.S. Pat. No. 8,448,895. Executed Nov. 28. pp. 1-81.
Declaration of Reza Abhari. In re U.S. Pat. No. 8,695,920, claims 1-4, 7-14, 17 and 19. Executed Nov. 29. pp. 1-102.
Declaration of Dr. Magdy Attia. In re U.S. Pat. No. 8,313,280. Executed Oct. 21, 2016. pp. 1-88.
Lord, W.K., MacMartin, D.G., and Tillman, T.G. (2000). Flow control opportunities in gas turbine engines. American Institute of Aeronautics and Astronautics. pp. 1-15.
Daly, M. Ed. (2010). Jane's Aero-Engine. Issue Twenty-seven. Mar. 2010. p. 633-636.
Roux, E. (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Pat. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p. 45-47.
Norton, M. and Karczub, D. (2003). Fundamentals of noise and vibration analysis for engineers. Press Syndicate of the University of Cambridge. New York: New York. p. 524.
U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003.. p. 1-6 and Appendices.
Vasudevan, A.K. and Petrovic, J.J. (1992). A comparative overview of molybedenum disilicide composites. Materials Science and Engineering, A155, 1992. pp. 1-17.
Clarke, D.R. and Levi, C.G. (2003). Materials design for the next generation thermal barrier coatings. Annual. Rev. Mater. Res. vol. 33. 2003. pp. 383-417.
Lee, K.N. (2000). Current status of environmental barrier coatings for Si-Based ceramics. Surface and Coatings Technology 133-134, 2000. pp. 1-7.
Bornstein, N. (1993). Oxidation of advanced intermetallic compounds. Journal de Physique IV, 1993, 03 (C9), pp. C9-367-C9-373.
Krenkel, W., Naslain, R., and Schneider, H. Eds. (2001). High temperature ceramic matrix composites pp. 224-229. Weinheim, DE: Wiley-VCH Verlag GmbH.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Shah, D.M. (1992). MoSi2 and other silicides as high temperature structural materials. Superalloys 1992. The Minerals, Metals, & Materials Society. pp. 409-422.
Zhao, J.C. and Westbrook, J.H. (2003). Ultrahigh-temperature materials for jet engines. MRS Bulletin. vol. 28 (9). Sep. 2003. pp. 622-630.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Jacobson, N.S. (1993). Corrosion of silicon-based ceramics in combustion environments. J. Am. Ceram. Soc. 76 (1). pp. 3-28.
Jorgensen, P.J., Wadsworth, M.E., and Cutler, I.B. (1961). Effects of water vapor on oxidation of silicon carbide. J. Am. Ceram. Soc. 44(6). pp. 248-261.
Xu, Y., Cheng, L., Zhang, L., Ying, H., and Zhou, W. (1999). Oxidation behavior and mechanical properties of C/SiC composites with Si-MoSi2 oxidation protection coating. J. of Mat. Sci. vol. 34. 1999. pp. 6009-6014.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Jeng, Y.-L., Lavernia, E.J. (1994). Processing of molybdenum disilicide. J. of Mat. Sci. vol. 29. 1994. pp. 2557-2571.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Sandaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Leckie, F.A. and Dal Bello, D.J. (2009). Strength and stiffness of engineering systems. Mechanical Engineering Series. Springer. pp. 1-3.
El-Sayad, A.F. (2008). Aircraft propulsion and gas turbine engines. Boca Raton, FL: CRC Press. pp. 215-219 and 355-360.
Bunker, R.S. (2005). A review of shaped hole turbine film-cooling technology. Journal of Heat Transfer vol. 127. Apr. 2005. pp. 441-453.
Notice of Opposition of European U.S. Pat. No. 3239459 dated Oct. 2, 2019 by Safran Aircraft Engines.
Kovich, G. and Steinke, R.J. (1976). Peformance of low-pressure-ratio low-tip-speed fan stage with blade tip solidity of 0.65. NASA TM X-3341. Feb. 1976. pp. 1-95.
Woodward, R.P., Bock, L.A., Heidelberg, L., and Hall, D.G. (1992). Far-field noise and internal modes from a ducted propeller at simulated aircraft takeoff conditions. NASA TM 105369. Jan. 6-9, 1992. pp. 1-15.
Crichton, D., and Hall, T. (2007). Fan design and operation for ultra low noise. University of Cambridge Department of Engineering. Apr. 2007. pp. 1-241.
Enoki, T. Kodama, H., Kusuda, S. (2013). Investigation of fan rotor interaction with pressure disturbance produced by downstream

(56) References Cited

OTHER PUBLICATIONS pylon. Proceedings of ASME Turbo Expo 2013: Trubine Technical Conference and Exposition Jun. 3-7, 2013. pp. 1-14.
Tsuchiya, N., Nakamura, Y., Goto, S., and Kodama, H. (2004). Low noise FEGV designed by numerical method based on CFD. Proceedings of ASME Turbo Expo 2004 Power for Land, Sea, and Air. Jun. 14-17, 2004. pp. 1-8.
Rossikhin, A., Pankov S., Brailko, I., and Mileshin, V. (2014). Numberical investigation of high bypass ratio fan tine noise. Proceedings of ASME Turbo Expo 2014: Turbine Technichal Conference and Exposition. Jun. 16-20, 2014. pp. 1-10.
Grace, S.M., Sondak, D.L, Dorney, D.J., and Longue, M. (2007). CFD computation of fan interaction noise. Proceedings of IMECE2007 2007 ASME International Mechanical Engineering Congress and Exposition. Nov. 11-14, 2007. pp. 1-11.
Rossikhin, A. A., Pankov, S.V., Khaletskiy, Y.D., and Mileshin, V.I. (2014). Computational study on acoustic features of fan model with leaned stators. Proceedings of ASME Turbo Expo 2014: Turbine Technical Conference and Exposition. Jun. 16-20, 2014. pp. 1-10.
Neitzel, R., Lee, R., and Chamay, A.J. (1973). Engine and installation preliminary design. Jun. 1, 1973. pp. 1-333.
Smith, L.H. Jr. (1993). NASA/GE fan and compressor research accomplishments. May 24-27, 1993. pp. 1-20.
Hughes, C.E., Podboy, G.G., Woodward, R.P., and Jeracki, R.J. (2005). The effect of bypass nozzle exit area on fan aerodynamic performance and noice in a model turbofan simulator. Proceedings of GT2005 ASME Turbo Expo 2005 Power for Land, Sea, and Air. Jun. 6-9, 2005. pp. 1-24.

\* cited by examiner

EFFICIENT, LOW PRESSURE RATIO PROPULSOR FOR GAS TURBINE ENGINES

CROSS REFERENCE TO RELATED APPLICATIONS

The present disclosure is a continuation of U.S. application Ser. No. 15/709,567, filed Sep. 20, 2017, which is a continuation of U.S. application Ser. No. 14/695,373, filed Apr. 24, 2015, which is a continuation-in-part of U.S. application Ser. No. 13/484,858, filed May 31, 2012, which is a continuation of U.S. application Ser. No. 13/176,365, filed Jul. 5, 2011.

STATEMENT REGARDING FEDERALLY SPONSORED RESEARCH OR DEVELOPMENT

This invention was made with government support under contract number NAS3-01138 awarded by NASA. The government has certain rights in the invention.

BACKGROUND

This disclosure relates to gas turbine engines and, more particularly, to an engine having a geared turbo fan architecture that is designed to efficiently operate with a high bypass ratio and a low pressure ratio.

The overall propulsive efficiency and fuel burn of a gas turbine engine depends on many different factors, such as the design of the engine and the resulting performance debits on the fan that propels the engine. As an example, the fan rotates at a high rate of speed such that air passes over the blades at transonic or supersonic speeds. The fast-moving air creates flow discontinuities or shocks that result in irreversible propulsive losses. Additionally, physical interaction between the fan and the air causes downstream turbulence and further losses. Although some basic principles behind such losses are understood, identifying and changing appropriate design factors to reduce such losses for a given engine architecture has proven to be a complex and elusive task.

SUMMARY

A gas turbine engine according to an example of the present disclosure includes a core flow passage, a bypass flow passage, and a propulsor arranged at an inlet of the bypass flow passage and the core flow passage. The propulsor includes a row of propulsor blades. The row includes no more than 20 of the propulsor blades. The propulsor has a pressure ratio of between about 1.2 or 1.3 and about 1.7 across the propulsor blades.

In a further embodiment of any of the foregoing embodiments, the pressure ratio is between about 1.3 and about 1.4.

In a further embodiment of any of the foregoing embodiments, each of the propulsor blades extends radially between a root and a tip and in a chord direction between a leading edge and a trailing edge at the tip to define a chord dimension (CD). The row of propulsor blades defines a circumferential pitch (CP) with regard to the tips. The row of propulsor blades has a solidity value (R) defined as CD/CP that is between about 0.9 or 1.0 and about 1.3.

In a further embodiment of any of the foregoing embodiments, the propulsor is coupled to be driven by a turbine through a spool, and a gear assembly is coupled between the propulsor and the spool such that rotation of the turbine drives the propulsor at a different speed than the spool.

In a further embodiment of any of the foregoing embodiments, the propulsor blades include a carbon-fiber reinforced polymer matrix material.

In a further embodiment of any of the foregoing embodiments, the polymer of the carbon-fiber reinforced polymer matrix material is a thermoplastic polymer.

In a further embodiment of any of the foregoing embodiments, the propulsor blades each further comprise a sheath on a leading edge thereof.

In a further embodiment of any of the foregoing embodiments, each of the propulsor blades includes a first distinct region of carbon-fiber reinforced polymer matrix material and a second distinct region of a non-carbon-fiber reinforced polymer matrix material.

In a further embodiment of any of the foregoing embodiments, the propulsor blades each include a distinct core that supports a skin of carbon-fiber reinforced polymer matrix material.

In a further embodiment of any of the foregoing embodiments, the skin of carbon-fiber reinforced polymer matrix material has a three-dimensional fiber structure.

In a further embodiment of any of the foregoing embodiments, the core is formed of a metallic material.

In a further embodiment of any of the foregoing embodiments, the core is formed of a fiber-reinforced material that is different in composition from the carbon-fiber reinforced polymer matrix material.

A further embodiment of any of the foregoing embodiments includes a case surrounding the propulsor, the case including a carbon-fiber reinforced polymer matrix material.

A further embodiment of any of the foregoing embodiments includes a case surrounding the propulsor. The case and the propulsor blades include a carbon-fiber reinforced polymer matrix material. The propulsor blades each include an airfoil body that has a distinct core that supports a skin of the carbon-fiber reinforced polymer matrix material, and a sheath secured on a leading edge of the airfoil body.

In a further embodiment of any of the foregoing embodiments, wherein the carbon-fiber reinforced polymer matrix material of the propulsor blades is different from the carbon-fiber reinforced polymer matrix material of the case with respect to composition.

In a further embodiment of any of the foregoing embodiments, the row includes no more than 17 of the propulsor blades.

In a further embodiment of any of the foregoing embodiments, the propulsor blades each include a distinct core that supports a skin of the carbon-fiber reinforced polymer matrix material.

In a further embodiment of any of the foregoing embodiments, the fiber reinforced polymer matrix material of the case includes carbon fibers.

A gas turbine engine according to an example of the present disclosure includes a core flow passage, a bypass flow passage, and a propulsor arranged at an inlet of the bypass flow passage and the core flow passage. The propulsor includes a row of propulsor blades. The row includes no more than 20 of the propulsor blades and the propulsor blades include a carbon-fiber reinforced polymer matrix material. Each of the propulsor blades extends radially between a root and a tip and in a chord direction between a leading edge and a trailing edge at the tip to define a chord dimension (CD). The row of propulsor blades defines a circumferential pitch (CP) with regard to the tips. The row of propulsor blades has a solidity value (R) defined as CD/CP that is less than about 1.2 or less than about 1.1.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
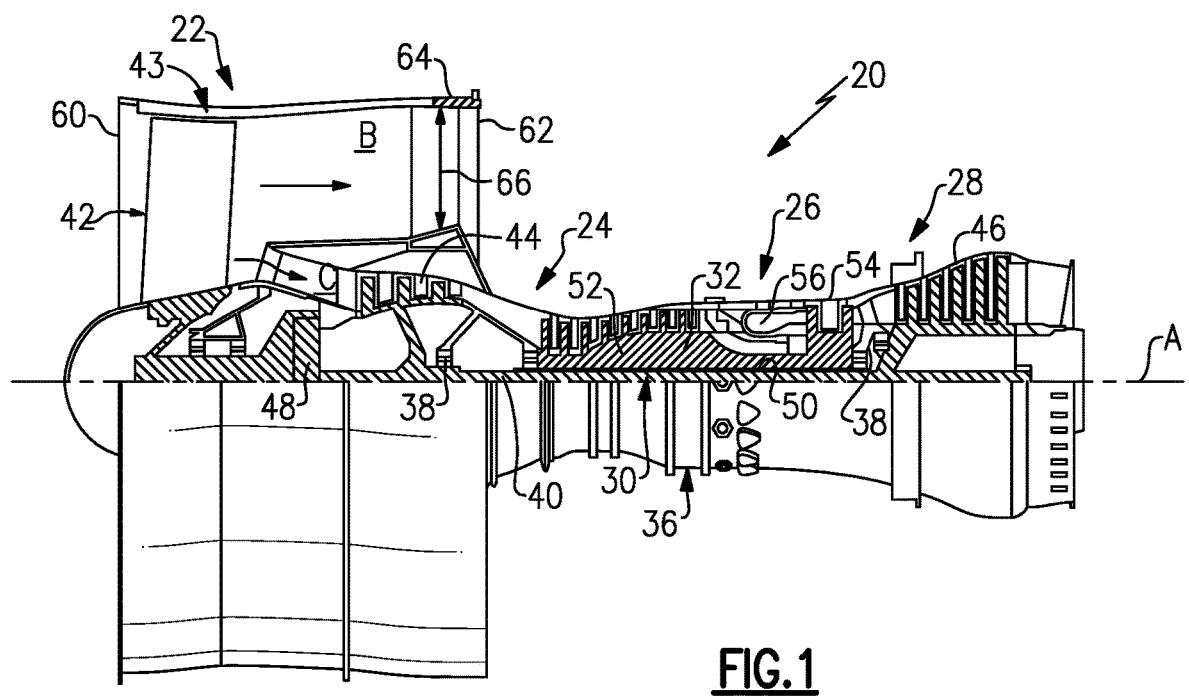
FIG. 1 is a schematic cross-section of an embodiment of a gas turbine engine.

FIG. 1 schematically illustrates a gas turbine engine 20. The gas turbine engine 20 may be a two-spool turbofan that generally incorporates a fan section 22, a compressor section 24, a combustor section 26 and a turbine section 28. Alternative engine architectures may include a single-spool design, a three-spool design, or an open rotor design, among other systems or features.

The fan section 22 drives air along a bypass flow passage B while the compressor section 24 drives air along a core flow passage C for compression and communication into the combustor section 26. Although depicted as a turbofan gas turbine engine, it is to be understood that the concepts described herein are not limited to use with turbofans and the teachings may be applied to other types of gas turbine engines.

The engine 20 includes a low speed spool 30 and high speed spool 32 mounted for rotation about an engine central longitudinal axis A relative to an engine static structure 36 via several bearing systems 38. The low speed spool 30 generally includes an inner shaft 40 that is coupled with a propulsor 42, a low pressure compressor 44 and a low pressure turbine 46. The propulsor 42 is in the fan section 22 and a case 43 surrounds the propulsor 42. The low pressure turbine 46 drives the propulsor 42 through the inner shaft 40 and a gear assembly 48, which allows the low speed spool 30 to drive the propulsor 42 at a different (e.g. lower) angular speed.

The high speed spool 32 includes an outer shaft 50 that is coupled with a high pressure compressor 52 and a high pressure turbine 54. A combustor 56 is arranged between the high pressure compressor 52 and the high pressure turbine 54. The inner shaft 40 and the outer shaft 50 are concentric and rotate about the engine central longitudinal axis A, which is collinear with their longitudinal axes.

A core airflow in core flow passage C is compressed by the low pressure compressor 44 then the high pressure compressor 52, mixed with the fuel in the combustor 56, and then expanded over the high pressure turbine 54 and low pressure turbine 46. The turbines 54, 46 rotationally drive the respective low speed spool 30 and high speed spool 32 in response to the expansion.

As shown, the propulsor 42 is arranged at an inlet 60 of the bypass flow passage B and core flow passage C. Air flow through the bypass flow passage B exits the engine 20 through an outlet 62 or nozzle. For a given design of the propulsor 42, the inlet 60 and the outlet 62 of the engine 20 define a design (fan) pressure ratio with regard to an inlet pressure at the inlet 60 and an outlet pressure at the outlet 62 of the bypass flow passage B. As an example, the design pressure ratio may be determined based upon the stagnation inlet pressure and the stagnation outlet pressure at a design rotational speed of the engine 20. In that regard, the engine 20 may optionally include a variable area nozzle 64 within the bypass flow passage B. The variable area nozzle 64 is operative to change a cross-sectional area 66 of the outlet 62 to thereby control the pressure ratio via changing pressure within the bypass flow passage B. The design pressure ratio may be defined with the variable area nozzle 64 fully open or fully closed.

Figure 2:
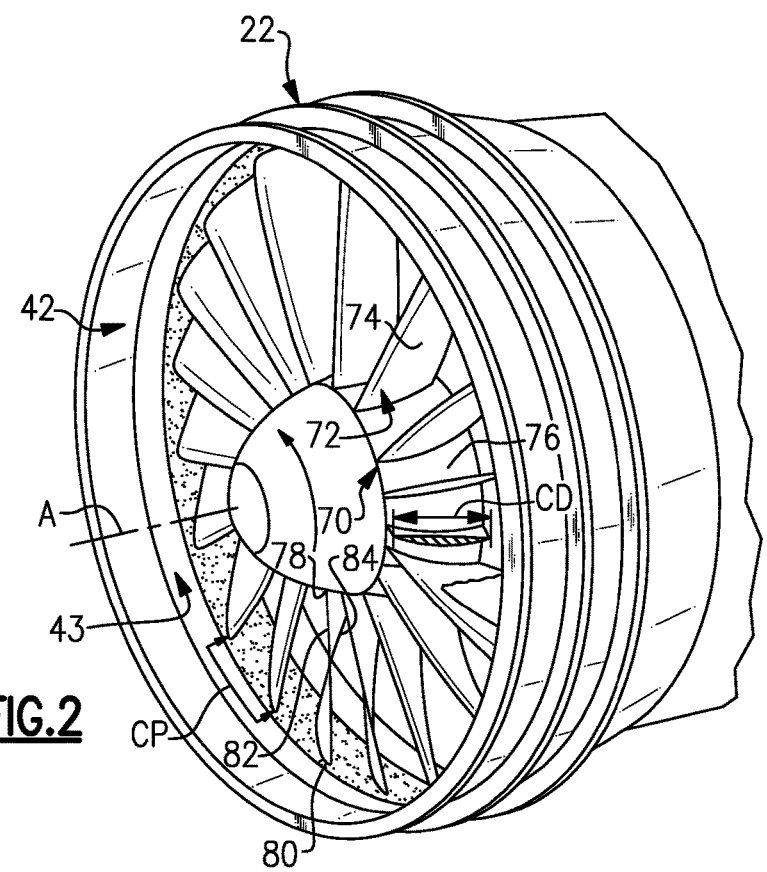
FIG. 2 is a perspective view of a fan section of the engine of FIG. 1.

Referring to FIG. 2, the propulsor 42, which in this example is a fan, includes a rotor 70 having a row 72 of propulsor blades 74 that extend a circumferentially around a hub 76. Each of the propulsor blades 74 extends radially outwardly from the hub 76 between a root 78 and a tip 80 and in a chord direction (axially and circumferentially) between a leading edge 82 and a trailing edge 84. A chord dimension (CD) is a length between the leading edge 82 and the trailing edge 84 at the tip of each propulsor blade 74. The row 72 of propulsor blades 74 also defines a circumferential pitch (CP) that is equivalent to the arc distance between the tips 80 of neighboring propulsor blades 74.

As will be described, the example propulsor 42 includes a number (N) of the propulsor blades 74 and a geometry that, in combination with the architecture of the engine 20, provides enhanced overall propulsive efficiency by reducing performance debits of the propulsor 42.

In the illustrated example, the number N of propulsor blades in the row 72 is no more than 20. In one example, the propulsor 42 includes 18 of the propulsor blades 74 uniformly circumferentially arranged about the hub 76. In other embodiments, the number N may be any number of blades from 12-20.

The propulsor blades 74 define a solidity value with regard to the chord dimension CD and the circumferential pitch CP. The solidity value is defined as a ratio (R) of CD/CP (i.e., CD divided by CP). In embodiments, the solidity value of the propulsor 42 is between 0.9 or 1.0 and 1.3. In further embodiments, the solidity value is from 1.1 to 1.2. In additional embodiments, the solidity value is less than 1.1, and in a further example is also greater than 0.85.

Additionally, in combination with the given example solidity values, the fan 22 of the engine 20 may be designed with a particular design pressure ratio. In embodiments, the design pressure ratio may be between 1.2 or 1.3 and 1.55. In a further embodiment, the design pressure ratio may be between 1.3 and 1.4. In further examples, the design pressure ratio is between 1.3 and 1.7.

The engine 20 may also be designed with a particular bypass ratio with regard to the amount of air that passes through the bypass flow passage B and the amount of air that passes through the core flow passage C. As an example, the design bypass ratio of the engine 20 may nominally be 12, or alternatively in a range of approximately 8.5 to 13.5 or 18.

The propulsor 42 also defines a ratio of N/R. In embodiments, the ratio N/R is from 9 to 20. In further embodiments, the ratio N/R is from 14 to 16. The table below shows additional examples of solidity and the ratio N/R for different numbers of propulsor blades 74.

TABLE

Number of Blades, Solidity and Ratio N/R

| Number of Blades (N) | Solidity | Ratio N/R |
| --- | --- | --- |
| 20 | 1.3 | 15.4 |
| 18 | 1.3 | 13.8 |
| 16 | 1.3 | 12.3 |
| 14 | 1.3 | 10.8 |
| 12 | 1.3 | 9.2 |
| 20 | 1.2 | 16.7 |
| 18 | 1.2 | 15.0 |
| 16 | 1.2 | 13.3 |
| 14 | 1.2 | 11.7 |
| 12 | 1.2 | 10.0 |
| 20 | 1.1 | 18.2 |
| 18 | 1.1 | 16.4 |
| 16 | 1.1 | 14.5 |
| 14 | 1.1 | 12.7 |
| 12 | 1.1 | 10.9 |
| 20 | 1.0 | 20.0 |
| 18 | 1.0 | 18.0 |
| 16 | 1.0 | 16.0 |
| 14 | 1.0 | 14.0 |
| 12 | 1.0 | 12.0 |

The disclosed ratios of N/R enhance the overall propulsive efficiency and fuel burn of the disclosed engine 20. For instance, the disclosed ratios of N/R are designed for the geared turbo fan architecture of the engine 20 that utilizes the gear assembly 48. That is, the gear assembly 48 allows the propulsor 42 to rotate at a different, lower speed than the low speed spool 30. In combination with the variable area nozzle 64, the propulsor 42 can be designed with a large diameter and rotate at a relatively slow speed with regard to the low speed spool 30. A relatively low speed, relatively large diameter, and the geometry that permits the disclosed ratios of N/R contribute to the reduction of performance debits, such as by lowering the speed of the air or fluid that passes over the propulsor blades 74.

Figure 3:
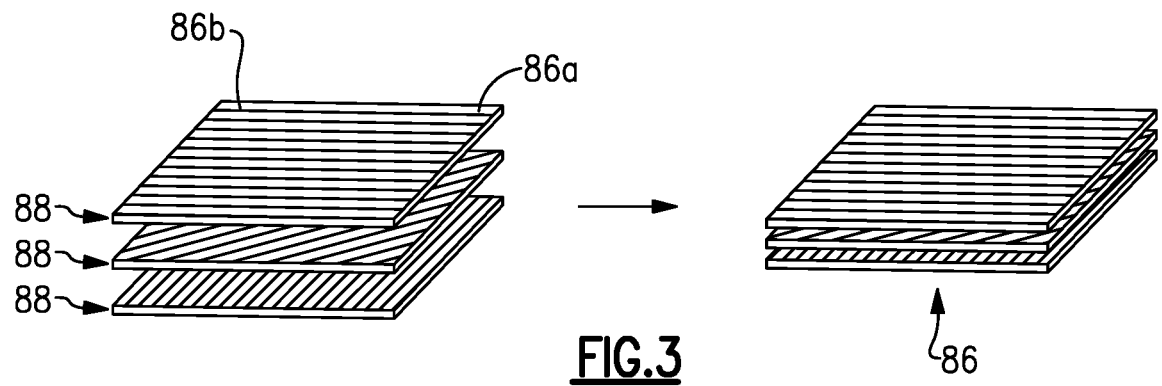
FIG. 3 illustrates an embodiment of a carbon-fiber reinforced polymer matrix material.

The propulsor blades 74 can include a carbon-fiber reinforced polymer matrix material, an example portion of which is depicted in FIG. 3 at 86. In this example, the material 86 includes carbon fibers 86a that are disposed in a polymer matrix 86b. The propulsor blades 74 can be formed exclusively of the material 86 or partially of the material 86 in combinations with alloys or other fiber-reinforced materials.

Figure 4:
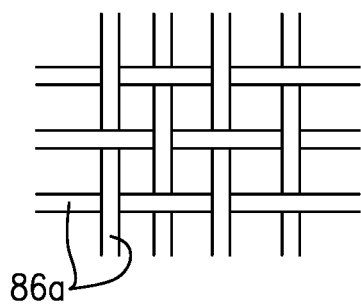
FIG. 4 illustrates an embodiment of a two-dimensional woven fiber structure.
Figure 5:
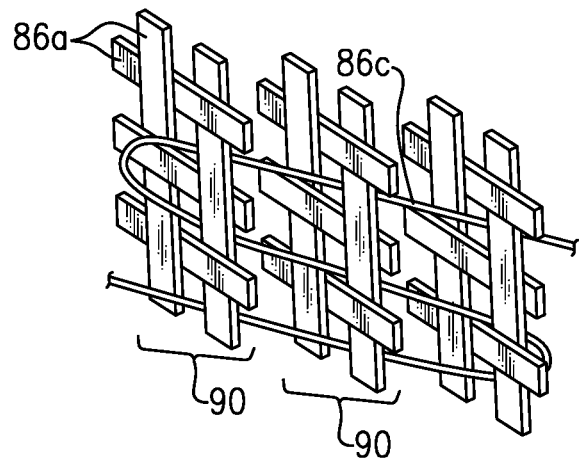
FIG. 5 illustrates an embodiment of a three-dimensional fiber structure.

The material 86 can include a plurality of carbon fiber layers 88 that are stacked and consolidated to form the material 86. For example, the fiber layers 88 can each have uni-directionally oriented fibers and the layers 88 can be cross-plied. In further examples, one or more of the layers 88 has a different fiber structure, such as but not limited to, random fiber orientation, woven, or three-dimensional. An example two-dimensional woven fiber structure is depicted in FIG. 4. An example three-dimensional fiber structure is depicted in FIG. 5. In this example, the fibers 86a are woven into sheets 90, and transverse fibers 86c bundle the sheets 90 to one another. As can be appreciated, other two- or three-dimensional fiber structures could alternatively or additionally be used.

The polymer matrix 86b can include thermoplastic polymer, thermoset polymer, or combinations thereof. Thermoset polymers can include, but are not limited to, epoxy and phenolic. Thermoplastic polymers can include, but are not limited to, polyethers and polyimides.

The carbon fibers 86a provide the material 86 with strength and stiffness. For example, the properties of the carbon fibers 86a can be selected in accordance with desired properties of the material 86, and thus desired properties of the propulsor blades 74. In one example, the carbon fibers 86a are polyacrylonitrile or polyacrylonitrile-based. The fibers are initially with polyacrylonitrile fibers and are then graphitized. Alternatively, the fibers are initially thermoplastic fibers that are then graphitized. Thermoplastics can include, but are not limited to, polyethylene, polyarylether, and poly ether ketones. In further examples, the carbon fibers 86a have an average diameter of 1-100 micrometers. Alternatively, the carbon fibers 86a are nano-sized and have a diameter of less than 1 micrometer. In other examples, the carbon fibers 86a are carbon-containing such that the fibers include carbon as a primary constituent or element. In one example, the carbon fibers 86a are carbide.

Figure 6:
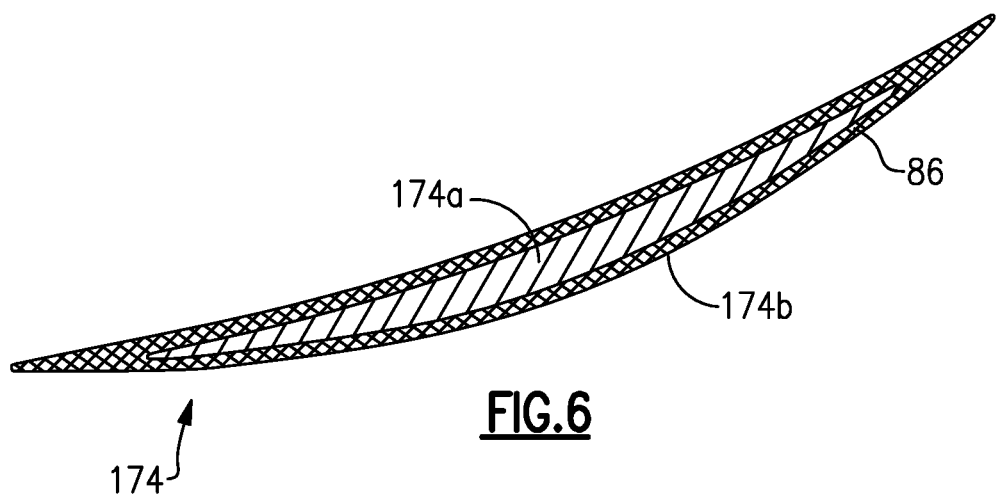
FIG. 6 is a cross-section of an embodiment of a propulsor blade that has a distinct core and a skin of carbon-fiber reinforced polymer matrix material.

FIG. 6 illustrates a cross-sectional view of another example propulsor blade 174, which may include any of the aforementioned features. In this disclosure, like reference numerals designate like elements where appropriate and reference numerals with the addition of one-hundred or multiples thereof designate modified elements that are understood to incorporate the same features and benefits of the corresponding elements. In this example, the propulsor blade 174 includes a distinct core 174a that supports a skin 174b of the carbon-fiber reinforced polymer matrix material 86. In this example, the core 174a is a solid piece, but it alternatively can be hollow to reduce weight.

The core 174a can be formed of a metallic material, a fiber reinforced polymer matrix material, or combinations thereof. An example metallic material includes a titanium-based alloy. The fiber reinforced polymer matrix material can include carbon fiber, as in any of the examples of the material 86. Alternatively, the fibers in the core 174a are non-carbon fibers. Example non-carbon fibers can include, but are not limited to, glass fibers, metallic fibers, ceramic fibers, polymeric fibers, and combinations thereof.

In further examples, the core 174 is formed of a fiber-reinforced material that is different in composition from the material 86 of the skin 174b. The difference in composition can be in the kinds of polymers of the matrices, the kinds of fibers, the amounts of the polymer matrices, the amounts of the fibers, or any combination of such differences.

In further examples, the skin 174b is the multi-layered structure of the material 86. For example, layers 88 are laid-up on or around the core 174a and then consolidated. Alternatively, the skin 174b is a continuous sleeve. The core 174a is inserted into the sleeve and then the skin 174b is consolidated. In one further example, the material 86 of the sleeve has a three-dimensional fiber structure.

Figure 7:
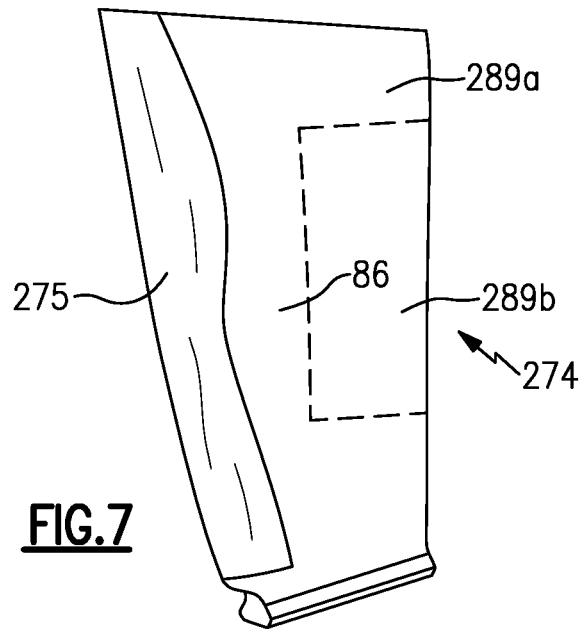
FIG. 7 illustrates an embodiment of a propulsor blade that has a sheath.

FIG. 7 illustrates another example propulsor blade 274 that is formed of the material 86. In this example, the propulsor blade 274 also includes a sheath 275 on a leading edge of the blade. For example, the sheath 275 protects the propulsor blade 274 from foreign object impact. In one example, the sheath 275 is formed of a metallic material. The metallic material can include, but is not limited to, a titanium-based alloy, a cobalt-based alloy, or combinations thereof. In further examples, the sheath 275 is multi-layered and includes at least one layer of a metallic material. One or more additional layers can include a layer of a metallic material of a different composition, a layer of a polymer-based material, or combinations thereof.

The sheath 275 is secured to the leading edge of the propulsor blade 274. In this regard, the sheath 275 can be bonded using an adhesive, mechanically attached to the blade, or secured by a combination of adhesive bonding and mechanical attachment.

In a further example, the propulsor blade 274 includes a first distinct region 289a (outside of dashed line region) of carbon-fiber reinforced polymer matrix material 86 and a second distinct region 289b (inside dashed line region) of a non-carbon-fiber reinforced polymer matrix material. The non-carbon fibers can include, but are not limited to, glass fibers, aramid fibers, boron fibers, carbide fibers, or combinations thereof. The second distinct region 289b of non-carbon-fiber reinforced polymer matrix material provides the ability to locally tailor the performance of the propulsor blade 274 with regard to properties. For example, the vibrational properties are locally tailored through selection of the properties of the second distinct region 289b to control vibration or control response to an impact event.

Figure 8:
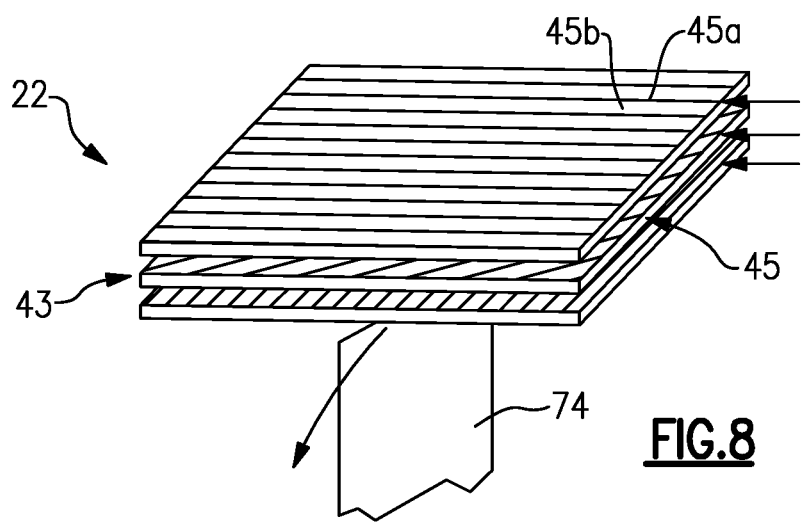
FIG. 8 illustrates a portion of an embodiment of a case and propulsor blade.

FIG. 8 illustrates selected portions of the fan section 22 of the engine 20, including the case 43 and a portion of one of the propulsor blades 74. The case 43 serves as a containment structure in the case of a blade release event. For example, the case 43 includes a fiber reinforced polymer matrix material 45. The material 45 includes fibers 45a that are disposed in a polymer matrix 45b. The fibers 45a can be carbon fibers or non-carbon fibers. Non-carbon fibers can include, but are not limited to, glass fibers, aramid fibers, or combinations thereof. In one example, the material 45 includes a plurality of fiber layers 45c that are stacked and consolidated to form the material 45. For example, all of the layers 45c have the same kind of fibers. In other examples, alternating layers 45c, or an alternating pattern of layers 45c, have different kinds of fibers, one of which is carbon fibers.

In further examples, the carbon-fiber reinforced polymer matrix material 86 of the propulsor blades 74 is different from the carbon-fiber reinforced polymer matrix material 45 of the case 43 with respect to composition. The difference in composition can be in the kinds of polymers of the matrices, the kinds of fibers, the amounts of the polymer matrices, the amounts of the fibers, or any combination of such differences. Further, the differences can be tailored for thermal conformance between the propulsor blades 74 and the case 43.

Figure 9:
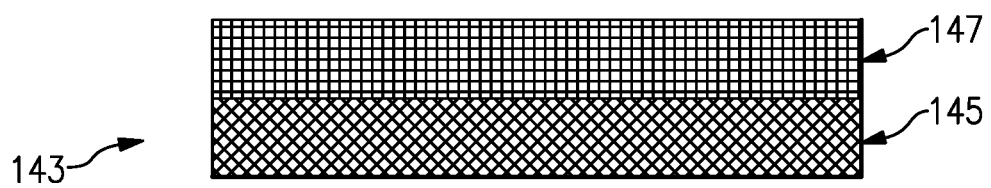
FIG. 9 illustrates another embodiment of a case.

FIG. 9 illustrates another example case 143 that includes a layer of the material 45 adjacent a layer 147. The layer 147 can be a layer of carbon-fiber reinforced polymer matrix material, non-carbon-fiber reinforced polymer matrix material, or metallic material, such as in a honeycomb or acoustic structure.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine comprising:
a gear assembly;
a bypass flow passage;
a fan located upstream of the bypass flow passage;
a first shaft and a second shaft;
a first turbine coupled through the gear assembly to the fan;
a first compressor coupled with the first shaft; and
a second turbine coupled with the second shaft;
wherein the fan includes a hub and a row of fan blades that extend from the hub, and the row includes a number (N) of the fan blades that is from 16 to 20, a solidity value (R) at tips of the fan blades, and a ratio of N/R that is from 12.3 to 16.0.

2. The gas turbine engine as recited in claim 1, wherein the number of fan blades is 20 and N/R is 15.4.

3. The gas turbine engine as recited in claim 1, wherein the number of fan blades is 18 or 20.

4. The gas turbine engine as recited in claim 3, wherein the bypass flow passage includes an inlet and an outlet defining a design pressure ratio with regard to an inlet pressure at the inlet and an outlet pressure at the outlet at a design rotational speed of the engine, the design pressure ratio is from 1.2 to 1.4.

5. The gas turbine engine as recited in claim 3, wherein the bypass flow passage includes an inlet and an outlet defining a design pressure ratio with regard to an inlet pressure at the inlet and an outlet pressure at the outlet at a design rotational speed of the engine, the design pressure ratio is from 1.3 to 1.4.

6. The gas turbine engine as recited in claim 1, further comprising a case surrounding the fan, and the fan is a single fan stage.

7. The gas turbine engine as recited in claim 6, wherein each of the fan blades is fixed in position between the hub and the tip.

8. The gas turbine engine as recited in claim 7, wherein the fan blades are formed of a fiber-reinforced polymer matrix material.

9. The gas turbine engine as recited in claim 6, wherein the first compressor is a 3-stage compressor.

10. The gas turbine engine as recited in claim 7, wherein the first turbine is a 5-stage turbine.

11. The gas turbine engine as recited in claim 10, further comprising a second turbine coupled with the second shaft, and the second turbine is a 2-stage turbine.

12. A gas turbine engine comprising:
a gear assembly;
a bypass flow passage;
a fan located upstream of the bypass flow passage;
a first shaft and a second shaft;
a first turbine coupled through the gear assembly to the fan;
a first compressor coupled with the first shaft; and
a second turbine coupled with the second shaft;
wherein the fan includes a hub and a row of fan blades that extend from the hub, and the row includes a number (N) of the fan blades that is, a solidity value (R) at tips of the fan blades, and a ratio of N/R that is from 13.8 to 16.4.

13. The gas turbine engine as recited in claim 12, wherein the bypass flow passage includes an inlet and an outlet defining a design pressure ratio with regard to an inlet pressure at the inlet and an outlet pressure at the outlet at a design rotational speed of the engine, the design pressure ratio is from 1.2 to 1.4.

14. The gas turbine engine as recited in claim 12, wherein each of the fan blades is fixed in position between the hub and the tip, further comprising a case surrounding the fan, the fan is a single fan stage, and the fan blades are formed of a fiber-reinforced polymer matrix material.

15. The gas turbine engine as recited in claim 14, wherein the first compressor is a 3-stage compressor and the first turbine is a 5-stage turbine, further comprising a second turbine coupled with the second shaft, and the second turbine is a 2-stage turbine.

16. A gas turbine engine comprising:
a gear assembly;
a bypass flow passage;
a fan located upstream of the bypass flow passage;
a first shaft and a second shaft;
a first turbine coupled through the gear assembly to the fan;
a first compressor coupled with the first shaft; and
a second turbine coupled with the second shaft;
wherein the fan includes a hub and a row of fan blades that extend from the hub, and the row includes a number (N) of the fan blades that is 18 or 20 and a solidity value (R) at tips of the fan blades, where for 20 fan blades the solidity value (R) is 1.3, 1.1, or 1.0 such that a ratio of N/R is, respectively, 15.4, 18.2, or 20, or where for 18 fan blades the solidity value (R) is 1.3, 1.2, or 1.1 such that the ratio of N/R is, respectively, 13.8, 15, or 16.4.

17. The gas turbine engine as recited in claim 16, wherein the number of fan blades is 20.

18. The gas turbine engine as recited in claim 16, wherein the number of fan blades is 18.

19. A gas turbine engine comprising:
a bypass flow passage;
a fan located upstream of the bypass flow passage;
a first turbine;
a first compressor; and
means for coupling an extraction of energy from the first turbine to the first compressor and the fan, wherein the fan includes a hub and a row of fan blades that extend from the hub, and the row includes a number (N) of the fan blades that is from 16 to 20, a solidity value (R) at tips of the fan blades, and a ratio of N/R that is from 12.3 to 16.

20. The gas turbine engine as recited in claim 19, wherein the means for coupling an extraction of energy comprises a first shaft, wherein the first turbine is coupled with the first shaft, and the first shaft is coupled with the first compressor and the fan is coupled to a gear assembly which is coupled to the first shaft.

* * * * *